(12) United States Patent
Natsumeda et al.

(10) Patent No.: US 11,604,934 B2
(45) Date of Patent: Mar. 14, 2023

(54) FAILURE PREDICTION USING GRADIENT-BASED SENSOR IDENTIFICATION

(71) Applicant: NEC Laboratories America, Inc., Princeton, NJ (US)

(72) Inventors: Masanao Natsumeda, Princeton Junction, NJ (US); Wei Cheng, Princeton Junction, NJ (US); Haifeng Chen, West Windsor, NJ (US); Yuncong Chen, Plainsboro, NJ (US)

(73) Assignee: NEC Corporation

( * ) Notice: Subject to any disclaimer, the term of this patent is extended or adjusted under 35 U.S.C. 154(b) by 371 days.

(21) Appl. No.: 16/816,752

(22) Filed: Mar. 12, 2020

(65) Prior Publication Data

US 2020/0380295 A1 Dec. 3, 2020

Related U.S. Application Data

(60) Provisional application No. 62/853,828, filed on May 29, 2019.

(51) Int. Cl.
| | |
|---|---|
| *G06K 9/00* | (2022.01) |
| *G06K 9/62* | (2022.01) |
| *G06N 3/084* | (2023.01) |
| *G06N 3/04* | (2023.01) |
| *G06N 3/063* | (2023.01) |

(52) U.S. Cl.
CPC .......... *G06K 9/6215* (2013.01); *G06K 9/623* (2013.01); *G06N 3/0472* (2013.01); *G06N 3/063* (2013.01); *G06N 3/084* (2013.01)

(58) Field of Classification Search
CPC .... G06K 9/6215; G06K 9/623; G06K 9/0055; G06K 9/6288; G06N 3/0472; G06N 3/063; G06N 3/084; G06N 3/0481; G06N 3/0445; G06N 3/0454; G05B 23/024; G05B 23/0281; G05B 23/0286; G06V 10/82
See application file for complete search history.

(56) References Cited

U.S. PATENT DOCUMENTS

| | | | |
|---|---|---|---|
| 8,804,267 | B2 | 8/2014 | Huang et al. |
| 9,244,803 | B2 | 1/2016 | Adachi et al. |
| 10,816,951 | B2 * | 10/2020 | Abe ..................... G05B 19/058 |
| 11,169,288 | B1 * | 11/2021 | Johnson ................ G01V 1/306 |
| 2012/0191633 | A1 | 7/2012 | Liu et al. |
| 2013/0013138 | A1 | 1/2013 | Lu et al. |
| 2015/0205691 | A1 * | 7/2015 | Seto .................... G06F 11/3452 702/182 |
| 2015/0310349 | A1 | 10/2015 | Li et al. |
| 2016/0217378 | A1 * | 7/2016 | Bellala ................ G05B 23/024 |
| 2018/0157743 | A1 * | 6/2018 | Hori ..................... G06N 3/0445 |
| 2018/0365089 | A1 * | 12/2018 | Okanohara ........... G06N 7/005 |

(Continued)

*Primary Examiner* — Dhaval V Patel
(74) *Attorney, Agent, or Firm* — Joseph Kolodka

(57) ABSTRACT

Methods and systems for predicting failure in a cyber-physical system include determining a prediction index based on a comparison of input time series, from respective sensors in a cyber-physical system, to failure precursors. A failure precursor is detected in the input time series, responsive to a comparison of the prediction index to a threshold. A subset of the sensors associated with the failure precursor is determined, based on a gradient of the prediction index. A corrective action is performed responsive to the determined subset of sensors.

20 Claims, 6 Drawing Sheets

(56) References Cited

U.S. PATENT DOCUMENTS

2019/0087256 A1\* 3/2019 Horrell ............... G06F 11/0721
2019/0318288 A1\* 10/2019 Noskov ................. G06Q 10/04
2020/0167640 A1\* 5/2020 Sundareswara .......... G06N 3/08
2020/0349464 A1\* 11/2020 Lin ........................ G06N 3/084

\* cited by examiner

US 11,604,934 B2

FAILURE PREDICTION USING GRADIENT-BASED SENSOR IDENTIFICATION

RELATED APPLICATION INFORMATION

This application claims priority to U.S. Provisional Patent Application Ser. No. 62/853,828, filed on May 29, 2019, incorporated herein by reference herein its entirety.

BACKGROUND

Technical Field

The present invention relates to failure prediction in cyber-physical systems, and, more particularly, to the detection of failure precursors and the identification of associated sensor time series in such systems.

Description of the Related Art

Failure prediction is the task of predicting the occurrence of predefined failures. Through the task, a category of the failure which will happen, and its time frame can be provided. When it is accurately predicted, loss of the failure can be avoidable or minimized.

While failure precursors can be determined from stored failure event information, in many cases there is no description about such precursors. This makes it challenging to predict failures using detected precursors.

SUMMARY

A method for predicting failure in a cyber-physical system includes determining a prediction index based on a comparison of input time series, from respective sensors in a cyber-physical system, to failure precursors. A failure precursor is detected in the input time series, responsive to a comparison of the prediction index to a threshold. A subset of the sensors associated with the failure precursor is determined, based on a gradient of the prediction index. A corrective action is performed responsive to the determined subset of sensors.

A system for predicting failure in a cyber-physical system includes a neural network configured to determine a prediction index based on a comparison of input time series, from respective sensors in a cyber-physical system, to failure precursors, and to detect a failure precursor in the input time series, responsive to a comparison of the prediction index to a threshold. A failure preventer is configured to determine a subset of the sensors associated with the failure precursor based on a gradient of the prediction index, and to perform a corrective action responsive to the determined subset of sensors.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide failure prediction in cyber-physical systems. Information from sensors in a cyber-physical system is collected and is used to train a machine learning system. The machine learning system identifies circumstances within the sensor data that are associated with a failure in the cyber-physical system, thereby alerting operators to an imminent failure, including providing information regarding the type of failure and its time frame. Additionally, the present embodiments are able to identify particular sensors that are associated with the failure, making it easier to identify and address the underlying cause of the failure, potentially preventing the failure, or at least minimizing its impact.

When a precursor is detected, the present embodiments calculate a score for each sensor, based on gradients with respect to time series generated by each respective sensor. The present embodiments thereby provide some causative information underlying the failure. The scores may be based on the statistical values of the gradient over time in the input time series.

The present embodiments are superior to rule-based failure prediction systems. For example, machine learning systems are more general, and easier to apply to changing circumstances, than rule-based approaches. Additionally, the present embodiments use both the time series of sensors, as well as the history of failure events, to find signatures of failures, even if the number of occurrences of a failure is limited. Weights are given to subsequences in an early symptom region, which enhances the signal from important subsequences, rather than assuming that important subsequences immediately precede an abnormal period. As a result, the present embodiments are effective, even if the early symptom region includes many normal subsequences in a complex system. The present embodiments furthermore provide a list of the sensors that are relevant to understanding the detection of the precursor. This makes it easier to identify the root cause of a problem and can, in some circumstances, provide for automatic correction of the problem.

Figure 1:
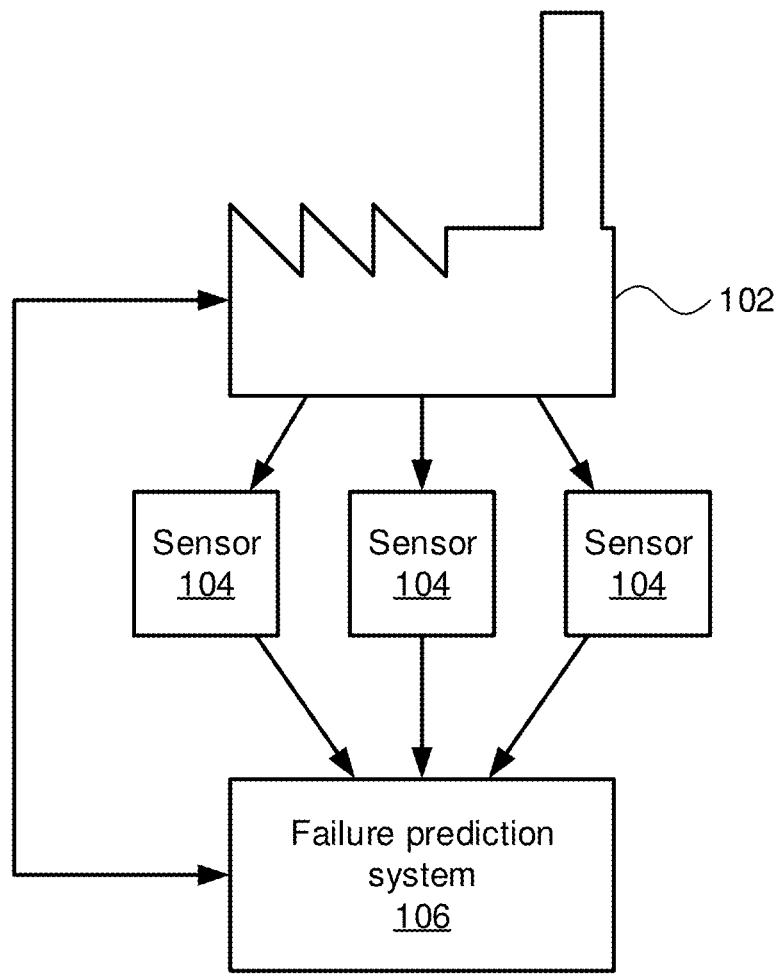
FIG. 1 is a diagram of the monitoring of a cyber-physical system, including a failure prediction system, in accordance with an embodiment of the present invention.

Referring now in detail to the figures in which like numerals represent the same or similar elements and initially to FIG. 1, a high-level system/method for failure prediction is illustratively depicted in accordance with one embodiment of the present invention. Cyber-physical systems, such as power stations, include a number of mechanical, physical, or otherwise tangible systems that operate to generate some useful output. These cyber-physical systems are monitored by a variety of sensors that track physical conditions of the system.

The cyber-physical system 102 is monitored by a set of sensors 104, which can each be either controllable or non-controllable. The sensors 104 record information about the cyber-physical system 102 and pass that information to a failure prediction system 106. This information is provided as respective time series, with each time series including a list of sensor values, with associated time information. The failure prediction system 106 records the time series information, as well as information regarding historical events, such as failure events. Descriptions of failure events may include an identification of the failure type, and the solution used to correct the failure. The failure precursor information from the sensor time series can also be described, to provide a clear relationship between the time series data and the failure precursor. The failure prediction system 106 trains a machine learning model using the collected data and optimizes parameters of the cyber-physical system 102 to prevent a detected failure, or category of failures, and minimize the impact of such failures, based on finding failure precursors within new sensor data.

The cyber-physical system 102 can be any appropriate system that integrates a physical or mechanical process with distributed monitoring. It is particularly contemplated that the cyber-physical system 102 can be implemented as a power plant or factory, but it should be understood that the present principles apply to any such system.

The physical status of the cyber-physical system 102 changes over time. Effects that causes changes to this status include environmental differences, including weather differences and seasonal differences, electricity loads, and the aging, deterioration, and breakdown of physical components. Failures can be caused by any disruption to the operation of the cyber-physical system 102. In some cases, failures can occur with little warning, for example due to a workplace accident or a sudden failure of a worn-out part. In other cases, precursor information indicating the failure can be detected in the outputs of the sensors 104 well in advance of the actual failure.

The sensors 104 can monitor any physical or electronic process or system within the cyber-physical system 102. Exemplary sensors 104 include environmental sensors that measure ambient or environmental information, such as temperature sensors, humidity sensors, and air pressure sensors; operational sensors that measure characteristics of the physical process, such as accelerometers, counters, and scales; and electronic sensors that measure characteristics of electronic or software processes, such as logs kept by software programs within the cyber-physical system 102. It should be understood that any given sensor block 104 can include multiple individual sensors, and that sensors 104 can be integrated with different physical machines or systems within the cyber-physical system 102. Any number of sensors 104 can be employed, and it is particularly contemplated that many such sensors 104 can all be used to provide real-time information about many different aspects of the cyber-physical system 102.

The sensors 104 are identified as being either controllable or non-controllable. A controllable sensor is one that measures a property of the cyber-physical system 102 that can be controlled by some parameter of the cyber-physical system 102. For example, a sensor that measures the temperature of ambient air can be a controllable sensor in an embodiment where a heating/cooling system is present, because control of the heating/cooling system is available to control the temperature. In another example, however, a sensor that measures the temperature of ambient air would not be a controllable sensor if it were exposed to the outside air, because there would be no process by which the cyber-physical system 102 could control that property.

In some embodiments, the sensors 104 can be arranged as "Internet of Things" devices, with each having respective communications capabilities that interface with a communications network within the cyber-physical system 102. For example, each sensor 104 can communicate with a wireless access point to send its information to the monitoring and optimization system 106. In an alternative embodiment, the sensors 104 can communicate with the failure prediction system 106 via a mesh network. It should be understood that any form of wired or wireless communications can be used instead of these specific examples.

The failure prediction system 106 will be described in greater detail below. The system 106 has the ability to issue commands to one or more parts of the cyber-physical system 102 to change the parameters of its operation, responsive to changes in the condition of the cyber-physical system 102 and based on detected failure precursor, to avoid or minimize failures. Following the example of a power plant, precursor information may include temperature information from particular sensors, which can indicate an ongoing or imminent failure of one or more components in the cyber-physical system 102. The failure prediction system 106 learns a model of the relationships between measured values from the sensors 104 and the resulting failures and uses the learned model to set parameters for the controllable sensors 104.

In some embodiments, the failure prediction system 106 can output a compact representation of a past failure. Time series information can be represented, for example, using a vector format, the conversion process for which is described in greater detail below. The conversion of time series to vectors can be validated, with grace periods for past failures being computed. A grace period, as used herein, refers to the period of time between the detection of a precursor and the occurrence of an associated failure, and can be used to help predict when a given failure will occur. The present embodiments can provide a period of possible occurrence of the failure using the mean and standard deviation of past failures' timing information. Thus, the time to failure can be, for example, $T+m\pm 3$ s, with T representing the current time stamp, m representing the mean of grace periods, and s representing the standard deviation of the grace period.

Figure 2:
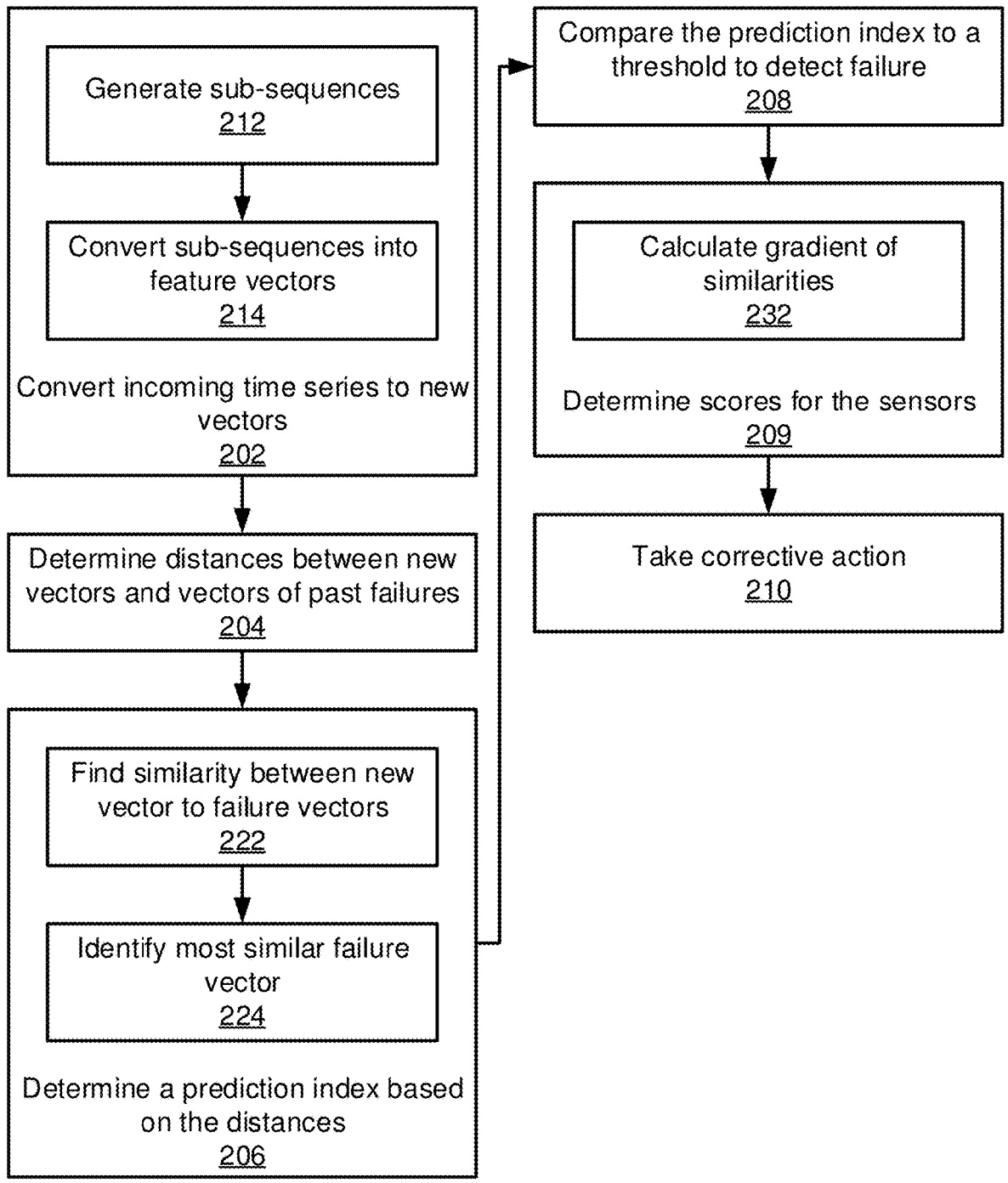
FIG. 2 is a block/flow diagram of a method for detecting and correcting a failure in a cyber-physical system, in accordance with an embodiment of the present invention.

Referring now to FIG. 2, a method of failure prediction is shown, illustrating how the failure prediction system 106 can detect failures within new time series. Block 202 converts incoming time series into new vectors, by generating sub-sequences of each time series in block 212 and converting the respective sub-sequences into vectors in block 214. Block 204 then determines distances between the new vectors and vectors that represent precursors of past failures. The distance can be computed as, for example, a Euclidean distance, but it should be understood that any appropriate distance metric can be used instead, such as the cosine similarity. Block 206 determines a prediction index based on the measured distances by finding a similarity (e.g., measured as a distance between vectors) between a new vector and vectors that represent previous failures in block 222. In block 224, the most similar failure vector is identified. The prediction index can be, for example, a minimum distance among the measured distances.

Block 208 compares the prediction index to a threshold. The threshold can be determined by cross validation of models used for time series conversion. For example, in a case with one failure class, N is the number of failures in the available training data. A model is built, and then the prediction index is computed for the rest of the available data. Modeling and computing are iterated, changing the training data for the model at each iteration. Given a set of time series, a performance metric is determined for different values of the threshold. The value that gives the best performance is selected for use. The performance metric can be any appropriate metric, such as recall, precision, or F1-score.

When the prediction index meets the threshold—for example, if the minimum distance between the new vector and the precursor vectors is smaller than a threshold distance—then it a failure has been detected. Block 209 determines scores for the sensors 104 to identify which sensor(s) 104 indicated the failure precursor, calculating a gradient of the measured similarities in block 209, and block 210 takes a corrective action. The corrective action can include a variety of different steps. In some embodiments, the corrective steps can include sending an alert to an operator, where the alert indicates the nature of the detected failure and any identified sensors 104 that are particularly associated with the failure's precursor, as well as information relating to the grade period of the failure. Such grace period information may include, for example, a histogram, and may also include at least one of the minimum, mean, median, and maximum of associated grace periods.

In some embodiments, the corrective steps can include controlling one or more parameters in the cyber-physical system 102 to adjust the operational conditions, for example to prevent the predicted failure or to mitigate its effects. For example, if a predicted failure is related to an overheating condition in a physical component, block 210 may issue commands to a cooling system within the cyber-physical system 102, to increase cooling and reduce the temperatures, thereby reducing the risk of failure.

Figure 3:
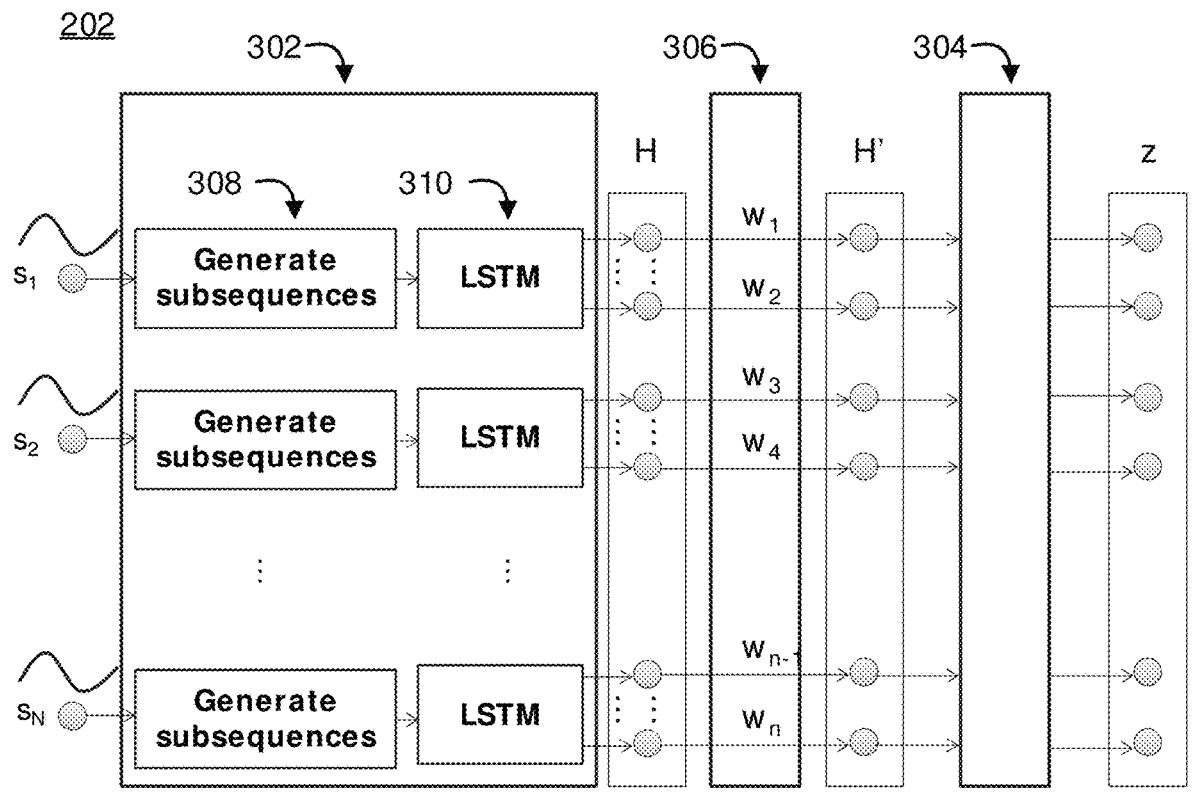
FIG. 3 is a block/flow diagram of a neural network for detecting failures in a cyber-physical system, in accordance with an embodiment of the present invention.

Referring now to FIG. 3, additional detail is shown on the conversion of time series into vectors in block 202. In some embodiments, time series conversion can be performed using a neural network, and can include a feature extractor 302, a feature selector 306, and a feature converter 304. It should be understood that the particular implementation of these components, disclosed herein, is not intended to be limiting. Instead, these components can be replaced by any appropriate structure for performing the time series conversion.

The feature extractor 302 can include subsequence generators 308 and Long Short-Term Memory (LSTM) models 310. It should be understood that the LSTM models 310, in particular, can be replaced by any appropriate neural network structure. The feature extractor 302 generates subsequences of given multi-variate time series with sliding window and then convert each of the subsequences into a feature vector. The feature extractor 302 can include LSTM models 310 to convert a subsequence of multi-variate time series into a feature vector. Since the feature extractor 302 gives a feature vector $h_t$, the output from feature extractor 302 may be a matrix $H=[h_1, h_2 \ldots h_t \ldots h_T]$. Each LSTM model 310 can be built for each individual attribute. The outputs from the LSTM models 310 are jointed to be a feature vector. The feature selector 306 gives weight Iv, for each element i in the feature vector, and then outputs $H'=[h'_1, h'_2 \ldots h'_t \ldots h'_T]$. The feature converter 304 converts multiple feature vectors H' into a new feature vector z. The output from the feature converter 304 is not affected by the order of the input feature vectors. The following equation satisfies this property:

$$z = \sum_t a_t h'_t \therefore a_t = f(h'_t)$$

where the function $f$ can be expressed as:

$$f(h'_t) = \text{softmax}(c^T \tanh(V h'^T_t) \odot \text{sigm}(U h'^T_t))$$

where t is the time, $\odot$ is the element-wise product, sigm($\cap$) is the sigmoid function, c is a weight vector, and U and V are weight matrices.

To train variables in the time series converter, triplet loss may be minimized, according to the following optimization:

$$F = \arg\min \sum_{i,j} \max\{d(a_i, p_j) - d(a_i, n_j) + m, 0\}$$

where $d(a_i, p_j)$ is a distance between the $i^{th}$ anchor and the $j^{th}$ positive sample, $d(a_i, n_j)$ is a distance between the $i^{th}$ anchor and the $j^{th}$ negative sample, and m represents the margin. Each of the anchors, positive samples, and negative samples is a vector. The vectors, z are output by the feature converter 304. The distance function d($\cap$) may compute a Euclidean distance between two vectors. Through the minimization, the feature extractor 302 and feature converter 304 are jointly trained.

In embodiments that employ LSTM models 310, the number of LSTM models 310 in the feature extractor 302 may be fewer than that of attributes. For example, the same LSTM model 310 can be applied over all attributes and iterated that until all LSTM models 310 are applied, and then feature vectors from multiple LSTM models 310 are joined. The joined feature vector may be used as the feature vector from the feature extractor 304.

If multiple feature time series are generated from a time series, each LSTM model 310 may be built for each original attribute of the time series, and the multiple feature time series may be input to the LSTM model 310. Those multiple feature time series may be generated with some signal processing. Given a window size and applied sliding window strategy, it may generate time series of mean, variance, median, 5% quantile, 95% quantile, power spectral density within certain range of frequencies and coefficient of some parametric model for individual attributes such as Autoregressive coefficient, for example.

The feature selector 304 may give weight for input to the feature extractor 511 instead of output from the feature extractor 302.

Figure 4:
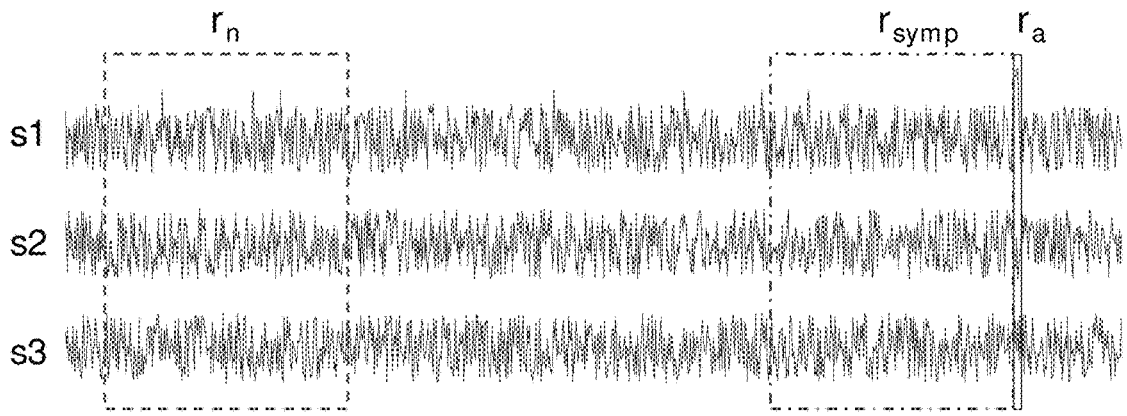
FIG. 4 is a diagram of a set of time series, with different time periods identified, in accordance with an embodiment of the present invention.

Referring now to FIG. 4, a diagram of a set of time series are shown. Training data includes at least one early symptom region for each kind of failure and at least one normal region. Given one multi-variate time series with history of a failure, three different regions are shown overlaid on multi-variate time series. Exemplary multi-variate time series $s_1$, $s_2$, and $s_3$ are shown. They are a normal region is designated as $r_n$, an early symptom region is designated as $r_{symp}$, and an abnormal region is designated as $r_a$. The normal region, $r_n$, does not include any failures, and may be far away from the abnormal region $r_a$. The early symptom region, $r_{symp}$, is a likely region which includes the symptom and may be a period just before the failure. Early symptom regions can be given as regions with a fixed-width, occurring just before abnormal regions. The width can be given as a parameter for training the models.

Positive samples are time series during the early symptom region. Negative samples include time series during the normal region. Upon selecting an anchor, negative samples can include time series during the early symptom region of the remaining classes, and may that include time series during the abnormal region of the remaining classes. Given the history of failures, one early symptom region is defined for each occurrence of a failure.

The simplest case is as follows: the length of the early symptom region, $r_{symp}$, is the same among different samples. In a typical use case, the length of the normal region, $r_n$, is longer than the early symptom region $r_{symp}$. If that is the case, then multiple multi-variate subsequences are given from multi-variate time series of the normal region $r_n$. Those multiple multi-variate subsequences, and the subsequence of the early symptom region $r_{symp}$, are the inputs to the signature generator 308. Each of them is converted into z, and then fed to the optimization, described above, as the samples.

At least one anchor may be selected for each category excluding normal period data. For each anchor, samples which belong to the same category of the anchor become positive samples and the others become negative samples. When the length of $r_{symp}$ varies for each sample, the maximum length may be determined in advance of training. Moreover, the part in the feature extractor 304, which generates subsequences duplicates several subsequences, such that the number of vectors $h_t$ in H is constant.

In some embodiments, a score can be calculated for each sensor 104, in block 209, based on gradients in the prediction indices generated by block 206. In particular, a gradient is calculated for the distances of the prediction indices, for example using a neural network, with respect to the input time series segment. A z vector from a past failure is used to compute the gradient. The z vector may be the vector having a lowest calculated distance from the input time series. The gradient can be computed using, e.g., back propagation.

The present embodiments may assign a low score for those sensors 104 that have the same values among samples. If the minimum value is zero, then the value for matching sensor series can be set to zero, or a negative value. In general, time series that fluctuate tend to be more relevant than those with constant values. Thus, the present embodiments can change the value assigned to such sensors to a negative number, to indicate that it will not be considered over any positive-valued sensor scores. In some embodiments, the scores for constant-valued sensors can be saved in a separate table for review.

The present embodiments may compute a sensor's score based on gradients of a part of a loss function, determined with respect to the input time series data. If the loss function is triple loss, a z vector from past failures and a z vector from a normal period are also used to compute the gradient. In this case, the part of the loss function for the gradient includes two distances, including a distance $d(s,a_{min})$ between the z vector from the input time series segment s and that z vector from past failures that has a minimum distance from the input time series $a_{min}$, and a distance $d(s,n)$ between the z vector from the input time series segment s and the z vector from a negative sample n. The negative sample is the latest time series segment which does not generate a failure prediction alarm. The loss function can be expressed as:

$$L = d(s, a_{min}) - d(s, n)$$

In some embodiments, the loss function can be summed over different negative samples, as follows:

$$L = \sum_i d(s, a_{min}) - d(s, n_i)$$

This has the effect of smoothing the results. The use of multiple negative samples increases the contrast in scores between relevant and irrelevant sensors. Since the effect of irrelevant sensors can be regarded as essentially random, it is averaged out across the multiple negative samples.

The scores can be clustered, with the scores of sensors in a given cluster being added together. Sensors can be grouped based on domain knowledge. For example, sensor clusters can be based on particular sub-systems, based on their functions. In some embodiments, a user can be asked to designate a negative sample to compute the sensor's scores, as rule-based automatic selection sometimes doesn't work. For example, the latest normal period may belong to a different operation mode from that of a failure condition. However, there may be a normal period with the same operation mode. In such a case, using negative samples from the same operation mode gives more accurate results when identifying significant sensors.

Figure 5:
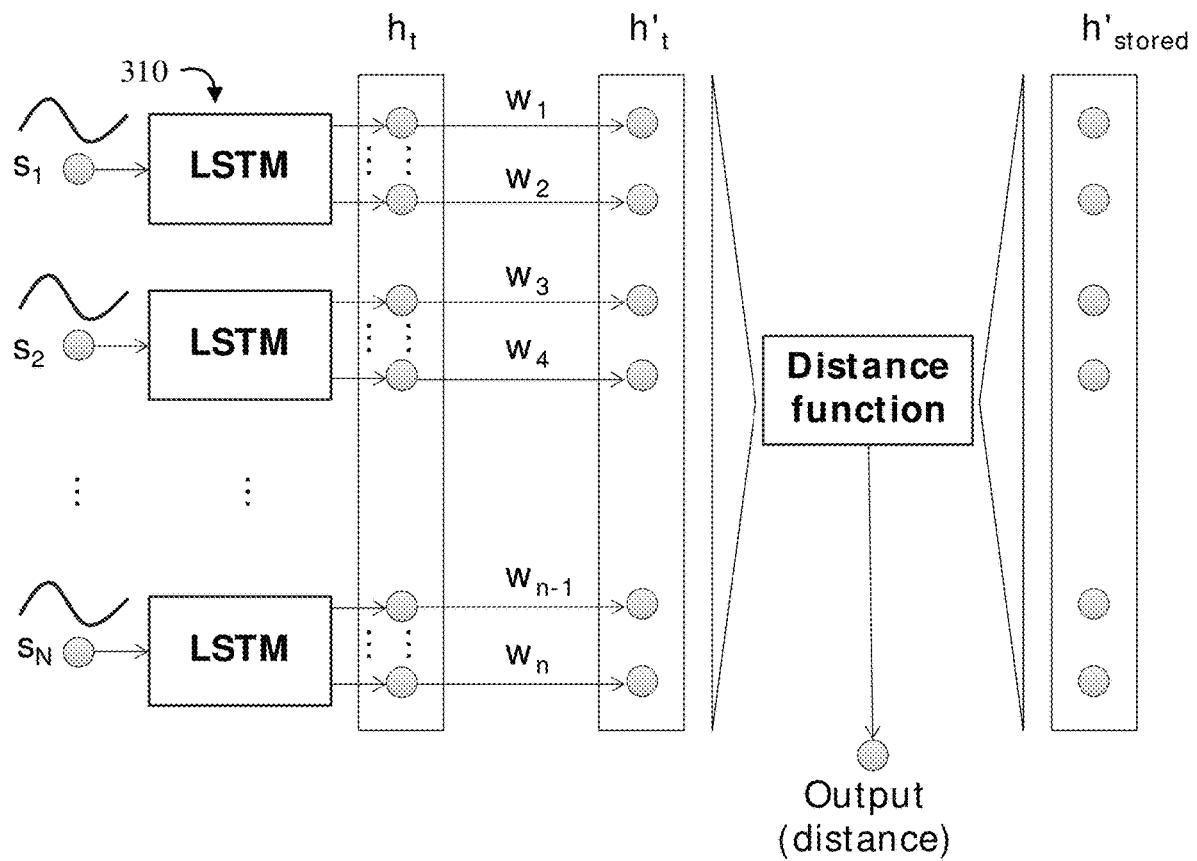
FIG. 5 is a block/flow diagram of a method for determining a distance between a given time period segment and stored feature vectors, in accordance with an embodiment of the present invention.

FIG. 5 is a block diagram showing a process for computing the distance between a given segment and stored feature vectors, for example in block 204. In this embodiment, a sub-segment can be selected as a compact representation of past failures for detection. Such embodiments use $h_t$ instead of the z vector.

The variance of the input signals $s_t$ is computed in normal periods, and then a trivial range of $s_t$ is determined. For each early symptom region $r_{symp}$, the most significant $s_t$, which is the earliest on the corresponding time, is determined and its corresponding feature vector $h'_t$ is stored as $h'_{stored}$ in the corresponding detector. The threshold of the detector can be defined based on a distribution of the distances from normal periods. The threshold may be the minimum of the distances. The threshold may be determined with some statistical methods such as m % quantiles of the distances, where m is a small real number. Some margin may be added to the threshold. After the training, the detectors keep monitoring the target system.

The time difference between the corresponding time of the detection and that of the beginning of its $r_a$ is stored in the knowledge database as empirical evidence for each category of failure. This distribution may be displayed to users. If subsequences are duplicated in training, $s_t$ can be summed for every duplicated one before the most significant is explored.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

Figure 6:
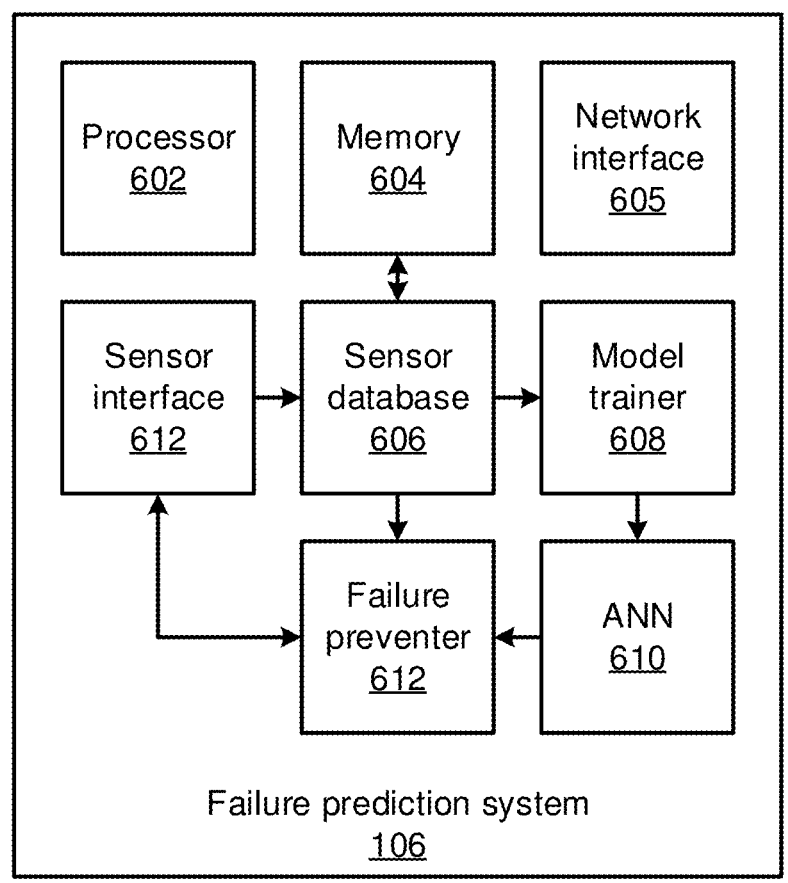
FIG. 6 is a block diagram of a failure prediction system, in accordance with an embodiment of the present invention.

Referring now to FIG. 6, additional detail on the failure prediction system 106 is shown. The system 106 includes a hardware processor 602 and a memory 604 and may optionally include one or more functional modules. In some embodiments, the functional modules can be implemented as software that is stored in the memory 604 and that is executed by the processor 602. In other embodiments, one or more functional modules can be implemented as one or more discrete hardware components in the form of, e.g., application-specific integrated chips or field programmable gate arrays.

A sensor interface 612 collects information from the sensors 104 via any appropriate wired or wireless communications medium and protocol. In some embodiments, the sensor interface 612 can communicate with the sensors 104 via a network interface 605, over any appropriate wired or wireless network medium and protocol. In some embodiments, the sensor interface 612 can communicate with one or more of the sensors 104 via a direct connection, using a specialized communications medium or protocol.

Sensor information is stored in memory 604 in a sensor database 606. The stored sensor information is used by model trainer 608 to train a machine learning model, such as artificial neural network (ANN) model 600. A failure preventer 612 uses the sensor data and the trained model 610 to determine that a failure precursor has occurred, and to take one or more corrective actions, for example altering one or more operational parameters of the cyber-physical system 102 to correct, prevent, or mitigate a failure. The failure preventer 612 can communicate with the cyber-physical system 102 using the network interface 605 to issue commands to components of the cyber-physical system 102.

Figure 7:
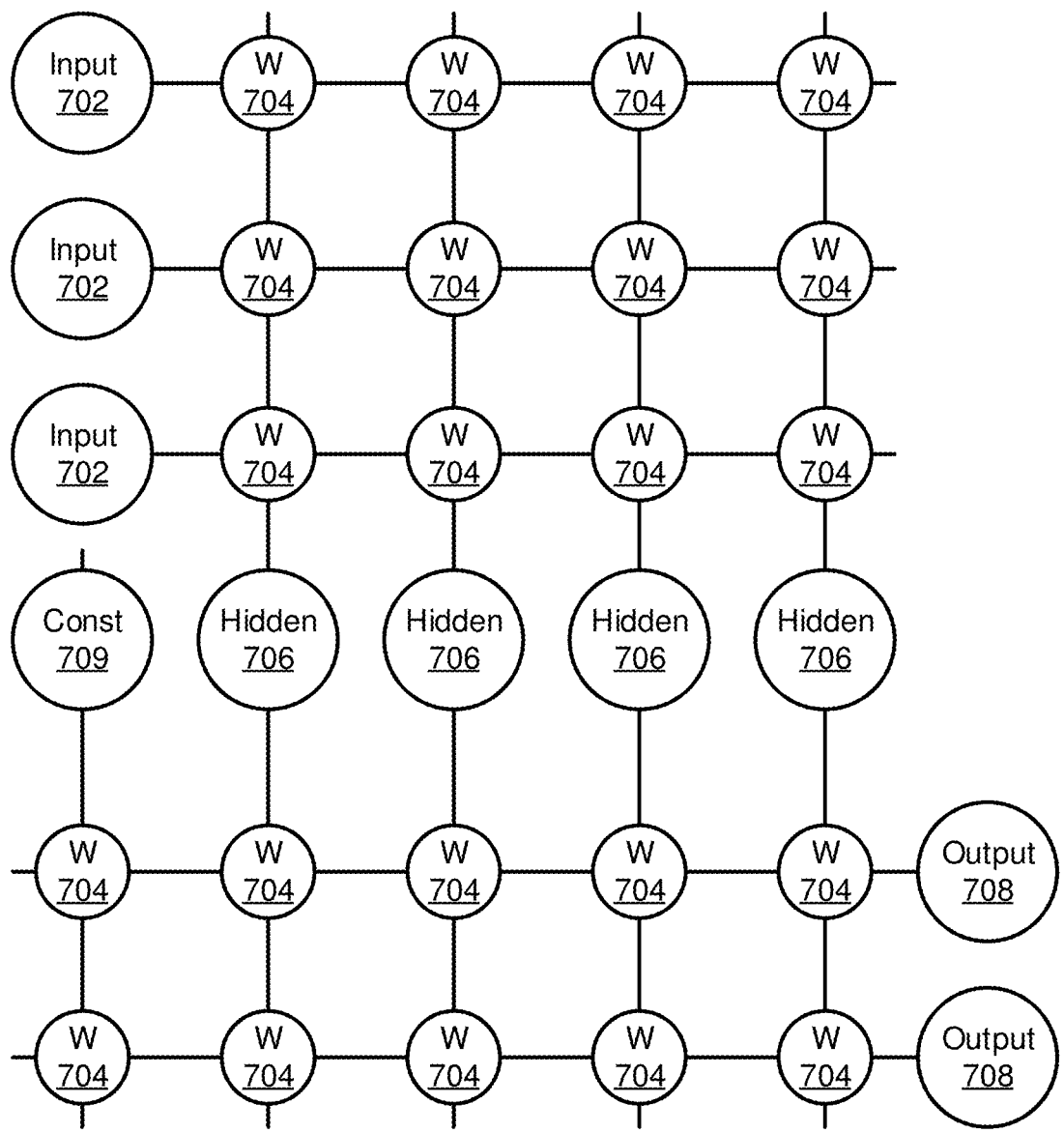
FIG. 7 is a block diagram of an artificial neural network, in accordance with an embodiment of the present invention.

Referring now to FIG. 7, an artificial neural network (ANN) architecture 610 is shown. It should be understood that the present architecture is purely exemplary, and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 702 each provide an input signal in parallel to a respective row of weights 704. The weights 704 each have a respective settable value, such that a weight output passes from the weight 704 to a respective hidden neuron 706 to represent the weighted input to the hidden neuron 706. In software embodiments, the weights 704 may simply be represented as coefficient values that are multiplied against the relevant signals. The signals from each weight adds column-wise and flows to a hidden neuron 706.

The hidden neurons 706 use the signals from the array of weights 704 to perform some calculation. The hidden neurons 706 then output a signal of their own to another array of weights 704. This array performs in the same way, with a column of weights 704 receiving a signal from their respective hidden neuron 706 to produce a weighted signal output that adds row-wise and is provided to the output neuron 708.

It should be understood that any number of these stages may be implemented, by interposing additional layers of arrays and hidden neurons 706. It should also be noted that some neurons may be constant neurons 709, which provide a constant output to the array. The constant neurons 709 can be present among the input neurons 702 and/or hidden neurons 706 and are only used during feed-forward operation.

During back propagation, the output neurons 708 provide a signal back across the array of weights 704. The output layer compares the generated network response to training data and computes an error. The error signal can be made proportional to the error value. In this example, a row of weights 704 receives a signal from a respective output neuron 708 in parallel and produces an output which adds column-wise to provide an input to hidden neurons 706. The hidden neurons 706 combine the weighted feedback signal with a derivative of its feed-forward calculation and stores an error value before outputting a feedback signal to its respective column of weights 704. This back propagation travels through the entire network 700 until all hidden neurons 706 and the input neurons 702 have stored an error value.

During weight updates, the stored error values are used to update the settable values of the weights 704. In this manner the weights 704 can be trained to adapt the neural network 700 to errors in its processing. It should be noted that the three modes of operation, feed forward, back propagation, and weight update, do not overlap with one another.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for predicting failure in a cyber-physical system, comprising:
   determining a prediction index as a Euclidean distance between time series vectors based on a comparison of a plurality of input time series, from respective sensors in a cyber-physical system, to each of a plurality of failure precursors;
   detecting a failure precursor in the plurality of input time series, responsive to a comparison of the prediction index to a threshold;
   determining a subset of the sensors associated with the failure precursor based on a gradient of the prediction index with respect to the plurality of input time series; and
   performing a corrective action responsive to the determined subset of sensors.

2. The method of claim 1, further comprising converting the plurality of input time series to an input vector representation.

3. The method of claim 2, wherein determining the prediction index comprises comparing the input vector representation to respective vector representations of each of the plurality of failure precursors.

4. The method of claim 3, wherein the prediction index is a degree of similarity between the input vector representation and a vector representation of at least one of the plurality of failure precursors.

5. The method of claim 2, wherein determining a subset of the sensors associated with the failure precursor comprises determining a score for each sensor.

6. The method of claim 5, wherein determining the score for each sensor comprises calculating a gradient for distances of the prediction index using a representative vector of a past failure.

7. The method of claim 6, wherein the representative vector of the past failure has a smallest distance from the input vector representation.

8. The method of claim 6, wherein the score for each sensor is determined using back propagation in a neural network.

9. The method of claim 5, wherein a score for a sensor that has a constant value output is set to zero, or a negative value.

10. The method of claim 1, wherein the corrective action comprises changing at least one operational parameter in the cyber-physical system.

11. A system for predicting failure in a cyber-physical system, comprising:
    a neural network configured to determine a prediction index as a Euclidean distance between time series vectors based on a comparison of a plurality of input time series, from respective sensors in a cyber-physical system, to each of a plurality of failure precursors, and to detect a failure precursor in the plurality of input time series, responsive to a comparison of the prediction index to a threshold;

a failure preventer configured to determine a subset of the sensors associated with the failure precursor based on a gradient of the prediction index with respect to the plurality of input time series, and to perform a corrective action responsive to the determined subset of sensors.

12. The system of claim 11, wherein the neural network is further configured to convert the plurality of input time series to an input vector representation.

13. The system of claim 12, wherein the neural network is further configured to compare the input vector representation to respective vector representations of each of the plurality of failure precursors.

14. The system of claim 13, wherein the prediction index is a degree of similarity between the input vector representation and a vector representation of at least one of the plurality of failure precursors.

15. The system of claim 12, wherein the failure preventer is further configured to determine a score for each sensor.

16. The system of claim 15, wherein the failure preventer is further configured to calculate a gradient for distances of the prediction index using a representative vector of a past failure.

17. The system of claim 16, wherein the representative vector of the past failure has a smallest distance from the input vector representation.

18. The system of claim 16, wherein the score for each sensor is determined using back propagation in the neural network.

19. The system of claim 15, wherein a score for a sensor that has a constant value output is set to zero, or a negative value.

20. The system of claim 11, wherein the corrective action comprises changing at least one operational parameter in the cyber-physical system.

* * * * *